(No Model.)
I. P. PILLSBURY.
NUT LOCK.
No. 274,025. Patented Mar. 13, 1883.
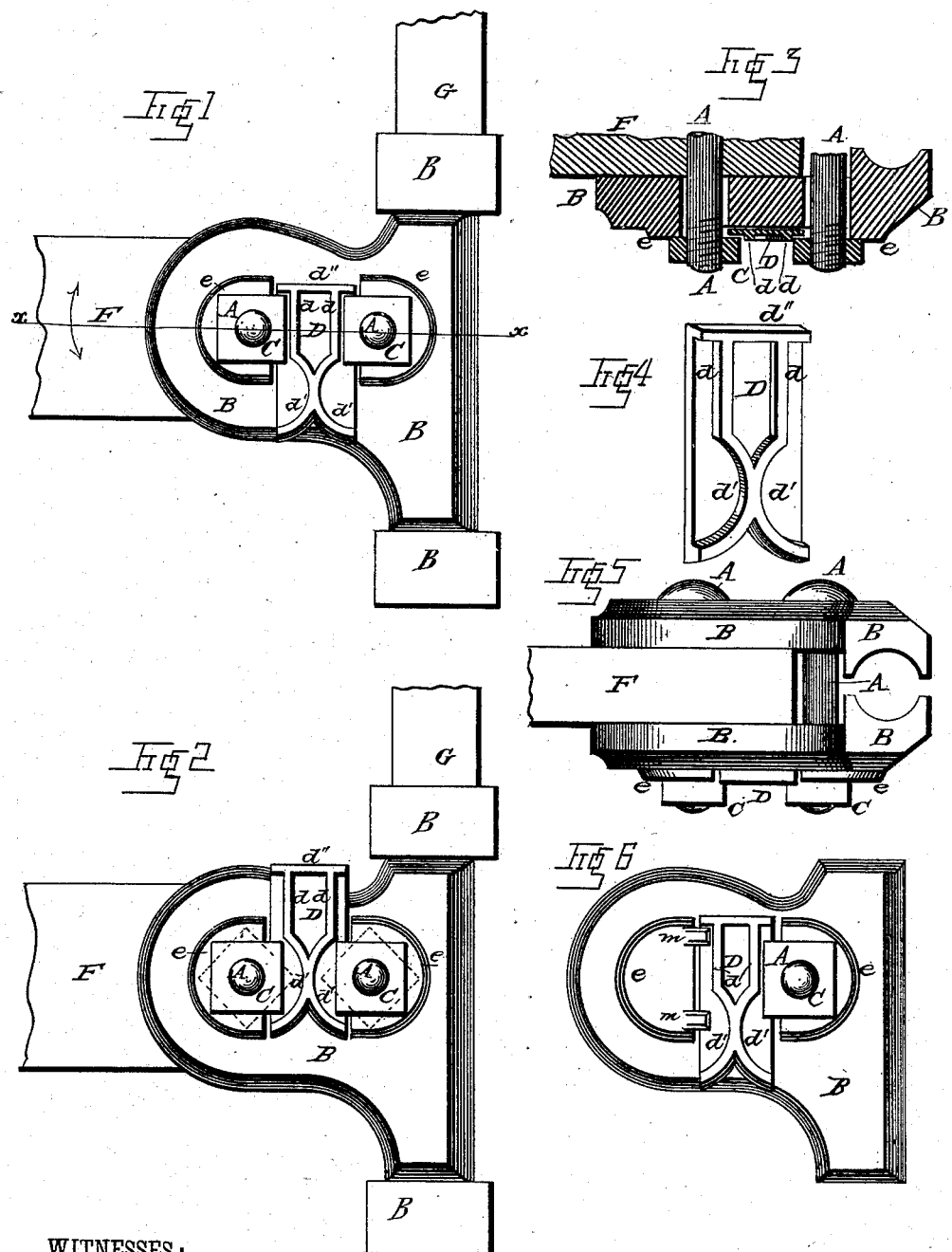
WITNESSES:
Fred. G. Dieterich
Jno. G. Hinkel
INVENTOR.
I. P. Pillsbury,
By W. P. Richards,
ATTORNEY

UNITED STATES PATENT OFFICE.

ITHAMAR P. PILLSBURY, OF MONMOUTH, ILLINOIS, ASSIGNOR TO THE PATTEE PLOW COMPANY, OF SAME PLACE.

NUT-LOCK.

SPECIFICATION forming part of Letters Patent No. 274,025, dated March 1?, 1883.

Application filed February 2, 1883. (No model.)

*To all whom it may concern:*

Be it known that I, ITHAMAR P. PILLSBURY, a citizen of the United States, residing at Monmouth, in the county of Warren and State of Illinois, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to nut-locks of that class designed to lock a pair of nuts; and it consists in the use of a plate so constructed that it may be slid down between the nuts to lock them, and may be partially withdrawn to permit turning either or both nuts on their respective bolts.

The invention further consists in constructions and combinations hereinafter described.

In the accompanying drawings, which illustrate my invention, Figure 1 is a side elevation of an ordinary coupling used in cultivators between the plow-beam and axle, showing my locking-plate in position to lock the nuts used thereon. Fig. 2 is a side elevation, showing the locking-plate partly withdrawn to permit of turning the nuts. Fig. 3 is a sectional plan in line $x\,x$ in Fig. 1, only showing one side of one of the coupling-plates. Fig. 4 is a perspective of the locking-plate. Fig. 5 is a top plan. Fig. 6 is a modification.

Referring to the drawings by letters, the same letter indicating the same part in the different figures, letter A represents bolts; B, a plate through which the bolts pass; C, nuts, one on each bolt; D, the locking-plate, formed of a thin plate of metal, rectangular in form and a little wider than the distance between the nuts C when two of their adjacent faces are parallel.

$d\,d$ are ledges on the plate D, extending in straight lines about half its length from one end, and at such distance from its sides that they may fit snugly between the parallel faces of the nuts, as shown at Fig. 1. The lower ends, $d'$, of the ledges $d$ curve inwardly toward each other, and extend to the lower end of the plate D and outwardly to its edges or sides, respectively, as shown. A ledge, $d''$, extends across the upper end of the plate D. Beneath each nut C is a boss, $e$, which extends outward from the plate B about the thickness of the plate D. The adjacent sides of the bosses $e$ are straight and parallel, and admit the plate D to slide between them.

In operation the plate D is placed in position as shown at Fig. 2, when the nuts may be screwed down snug to the bosses $e$, and thereby hold the plates B firmly. The curved ledges $d'$ permit the nuts to turn, so as to come down pretty close also to the plate D; but the bosses $e$ prevent them coming down so close as will prevent sliding the plate D endwise. When the nuts are screwed down the plate D is slid down to the position shown at Fig. 1, in which position the ledges $d$ rest between the nuts and form a lock to prevent turning them backward. The gravity of the plate D will hold it down to the position shown at Fig. 1, and it may be drawn upward to the position shown at Fig. 2, for the purpose of tightening, loosening, or removing the bolts, and the ledge $d''$ at one end and the outer ends of the ledges $d'$ at the other end of the plate D will prevent its removal endwise by coming in contact with the nuts, while its sides, resting beneath the edges of the nuts, will retain it from outward removal.

I have shown my improvement as applied to a cultivator-coupling, where such device is much needed.

F is one end of a plow-beam; B, coupling-plates, and G the part of the axle on which the coupling-plates and beam F swing laterally. The beam F has vertical movement on the left-hand bolt C. The plates B are so constructed that by turning them top side down the depth of plowing is changed. When so turned the plate D is then removed and put in place again, with the ledge $d''$ upward, as shown.

At Fig. 6 a modification is shown in which one side of the plate D slides beneath guides $m\,n$, which project over against the ledge $d$ and hold one side of said plate, while its other side is adapted to lock a single nut.

Having thus described my invention, what I claim as new, and desire to secure by Letters Patent, is—

1. In combination with the plate B, having a boss, e, bolts A, and nuts C, the locking-plate D, with sides adapted to slide beneath the nuts, and provided with ledges d d', substantially as and for the purpose specified.

2. In combination with the plate B, having a boss, e, bolts A, and nuts C, the locking-plate D, with sides adapted to slide beneath the edges of the nuts, and with ledges d d' d'', adapted to operate substantially as and for the purpose specified.

3. The combination, with two nuts and bolts, and plate B, with bosses e, of a locking-plate, D, constructed substantially as described, and for the purpose specified.

4. In combination with the plate B, having a boss, e, bolts A, and nuts C, the locking-plate D, with sides adapted to slide beneath the nuts, and provided with ledges d, substantially as and for the purpose specified.

5. In combination with the plate B, having a boss, e, bolts A, and nuts C, the locking-plate D, with sides adapted to slide beneath the nuts, and provided with ledges d d'', substantially as and for the purpose specified.

In testimony whereof I affix my signature in presence of two witnesses.

ITHAMAR P. PILLSBURY.

Witnesses:
W. B. WOLF,
H. H. PATTEE.